(12) United States Patent
Dwyer et al.

(10) Patent No.: US 6,484,130 B2
(45) Date of Patent: Nov. 19, 2002

(54) OFFICE ACCESSIBILITY INFORMATION PROVIDER

(75) Inventors: Maureen B. Dwyer, Tomkins Cove, NY (US); Rosemarie M. Gratz, Putnam Valley, NY (US); Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/725,742

(22) Filed: Nov. 29, 2000

(65) Prior Publication Data

US 2002/0065630 A1 May 30, 2002

(51) Int. Cl.[7] .......................... G06F 11/00; G06F 15/00
(52) U.S. Cl. ........................ 702/188; 709/310
(58) Field of Search .................... 702/188; 709/200, 709/206, 204, 310, 317, 318; 379/88.18, 67.1, 100.08, 88.12

(56) References Cited

U.S. PATENT DOCUMENTS

| | | | | |
|---|---|---|---|---|
| 5,742,905 A | * | 4/1998 | Pepe et al. ............ | 455/461 |
| 5,859,898 A | * | 1/1999 | Checco ................. | 379/88.01 |
| 5,892,856 A | * | 4/1999 | Cooper et al. ........... | 382/291 |
| 6,108,688 A | * | 8/2000 | Nielsen ................ | 709/206 |
| 6,175,859 B1 | * | 1/2001 | Mohler ................. | 709/206 |
| 6,333,973 B1 | * | 12/2001 | Smith et al. ............ | 379/88.12 |

OTHER PUBLICATIONS

James Middleton & Sinead Carew, Big Brother is watching you, Jun. 16, 1999, Newswire.*

* cited by examiner

*Primary Examiner*—John S. Hilten
*Assistant Examiner*—Demetrius Pretlow
(74) *Attorney, Agent, or Firm*—Ohlandt, Greeley, Ruggiero & Perle, L.L.P.; Daniel P. Morris

(57) ABSTRACT

A computer system including a network for obtaining complete information as to the best mode for a first person to communicate with a second person comprising means for sensing the presence of the second person in a given area and the activity in which he is engaged; means for connecting the means for sensing to the network; and means connected to the network for enabling the first person to determine the presence and status of messages in the form of e-mail or voice mail directed to the second person.

6 Claims, 6 Drawing Sheets

OFFICE ACCESSIBILITY INFORMATION PROVIDER

FIELD OF THE INVENTION

The invention is related to obtaining the information that will help to identify and enable the best communication mode (visit, mail, phone, fax, etc.) between people at different locations, such as different offices.

BACKGROUND OF THE INVENTION

In real-time, if a person would like to contact somebody in the same building but in a different office, there are several options. The person may telephorie the person they are trying to reach, send them an e-mail, send them an "instant" message, or, simply go to their office. Often-times, a problem results because the person in the office may be busy: on the phone, meeting with somebody in the office, or away at a meeting. There are certain methods that can assist in determining what the person is doing and whether they are busy or not. Programs like lotus notes-calendar allow for somebody to check the status of somebody else's schedule. This information does not suffice because it only describes meetings and appointments and a person may be busy doing other things in between meetings and appointments, like, telephone calls. Therefore, people who would like to contact another person must figure out the best way in which to reach that person. As noted, they may go to the person's office, call them, or, send an e-mail. But, the person in the office may be busy in a meeting, on the telephone or not returning e-mails because of being so backed up.

OBJECTS OF THE INVENTION

A principal object of the present invention is to enable a user to have complete information so that he may select the best communication mode for reaching other people (mail, visit office, fax, phone, etc.). Another object of the invention is to achieve the capability that will permit the user to understand whether a person in an office is available and is disposed for a meeting or other modes of communication.

SUMMARY

The present invention involves a system that gives a complete list and description on the computer of a person's whereabouts and activities in a certain area. For instance, in a building the computer gives the full information about whether a person is talking on the telephone, or whether the person checked their phone messages recently. It also gives full information about e-mail and whether the person has recently checked e-mail or is presently checking the e-mail. Most importantly, it gives a present status of the person in the office: does the person have a visitor, is the person at a meeting, is the person eating lunch, or is the person taking a nap.

Information about a person's office status can be identified through a video camera and other sensors. This information may be about how long a person is in the office and what type of situation the person is in. The information from the camera or other video sensors is sent to a special computer that analyzes the images and recognizes the situation and status of the person: is the person asleep, talking on the phone, relaxed. Some programs have been developed that can even figure out what type of mood a certain person may be in. See the patent application entitled "Conversational Data Mining" filed on Aug. 10, 1999. Therefore, this program may also let a user know what type of mood the other person is in and this may affect whether or not they choose to visit/contact the person. An option may be existent already, if a person desires privacy, he may choose to disclose none, for only a limited amount of information about his status.

DETAILED DESCRIPTION OF THE INVENTION

Figure 1:
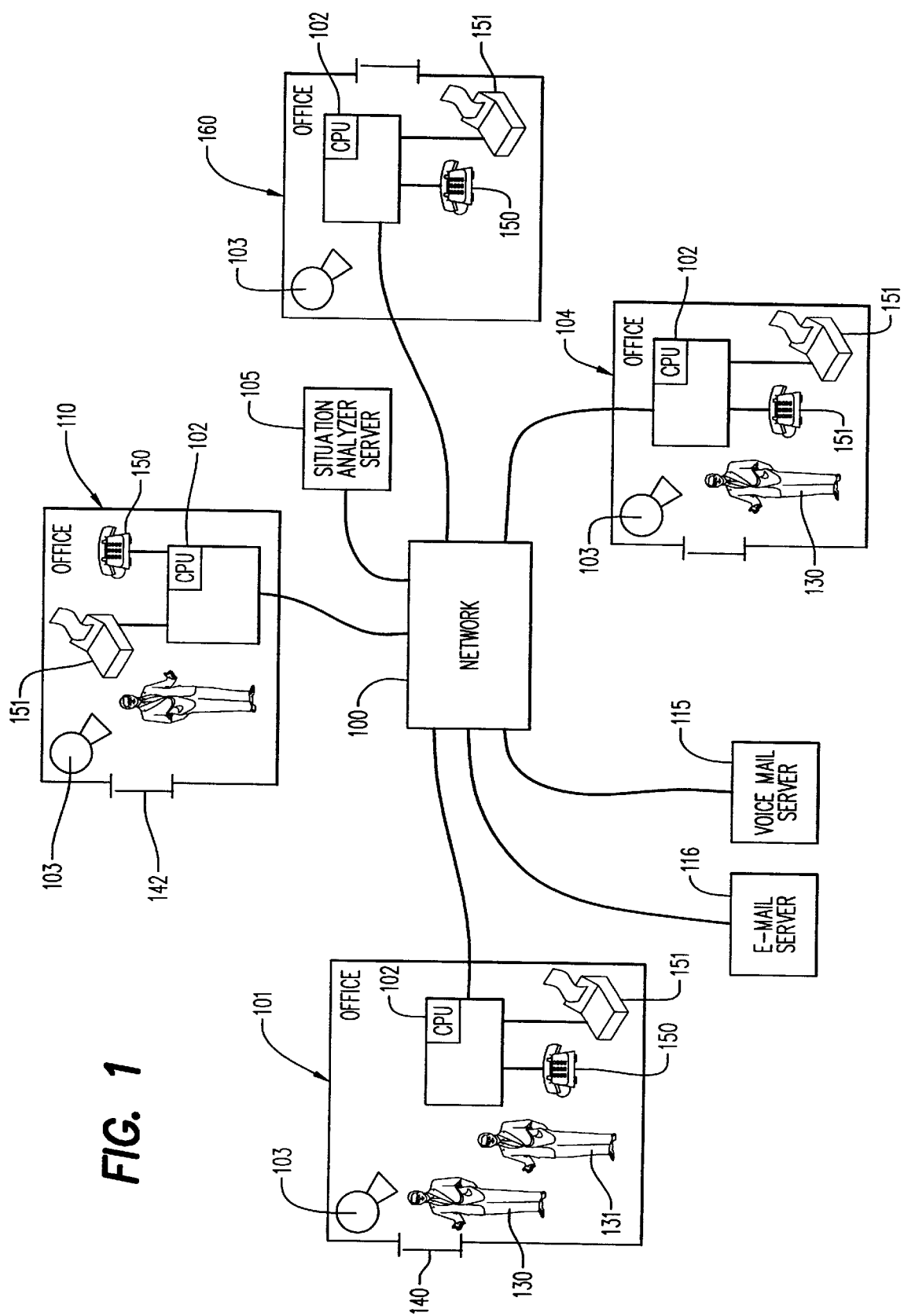
FIG. 1 is a block diagram that depicts a series of offices that are connects to a network.

FIG. 1 shows a series of offices 101, 110, 120, and 130 and these offices are connected to a network 100. Each office contains a camera/sensor 103, a computer 106 with a running CPU 102, a telephone 150 and a fax 151. There are two people in office 101 and the door 140 is open. A description of the situation in the office may be better described on the computer of a person who is interested in understanding the situation in office 101. For example, a user needs to decide whether to visit office 101. A camera can assist the user in making the decision of whether the user should visit office 101 in the following way: a camera may take an image of the door of office 101. This image can be analyzed by a special application running on a CPU or sent to a situation analyzation server 105. The situation analyzer server 105 which analyzes situations, decides which class they are in, and can identify the category that the person in office 101 is busy because there are two people 131 and 132 in the office and the door 140 is closed. The person in office 101 would be categorized as not busy if the door was open and there was only one person in the office. As a rule, if a person has an open office door (especially if he is a manager), this signifies that visitors are welcome.

Information that a person is busy or that they have visitors may enter the computer 103 for the user that is in office 101. Similarly, telephone and e-mail status may be sent via the network 100 to another user in another office (104). The situation analyzer server 105 allows for users to know whether the person they are trying to reach is on the telephone, how many unheard voice-mail messages does that person have, through the phone mail server 115. This function serves to tell a user if it is worth leaving a voice-mail for a person who has a large amount of unchecked voice-mail. The analyzer 105 also has access to the e-mail server 116, checking to see if the person the user is trying to reach has a large amount of e-mail to check and, therefore, would take a long time to reply to the user's e-mail. In many corporations, unheard phone-mail or unread e-mail is not kept in the user's office but on a server from which it is downloaded when the user chooses to listen to/read it. Therefore, if a user sees that a lot of messages (phone or e-mail) have accumulated on a server they may choose to save time by only going through the most urgent messages and eliminating the rest without reading them. If the user sees this type of situation but also notes that the person has no visitors, they may choose to visit the person in their office.

In office 160, there are no persons, therefore, a user must choose to either send an e-mail or make a telephone call and leave a message because of lack of other options. Office 110 has a person in it but the door is closed 142 because the person is very busy working.

Figure 2:
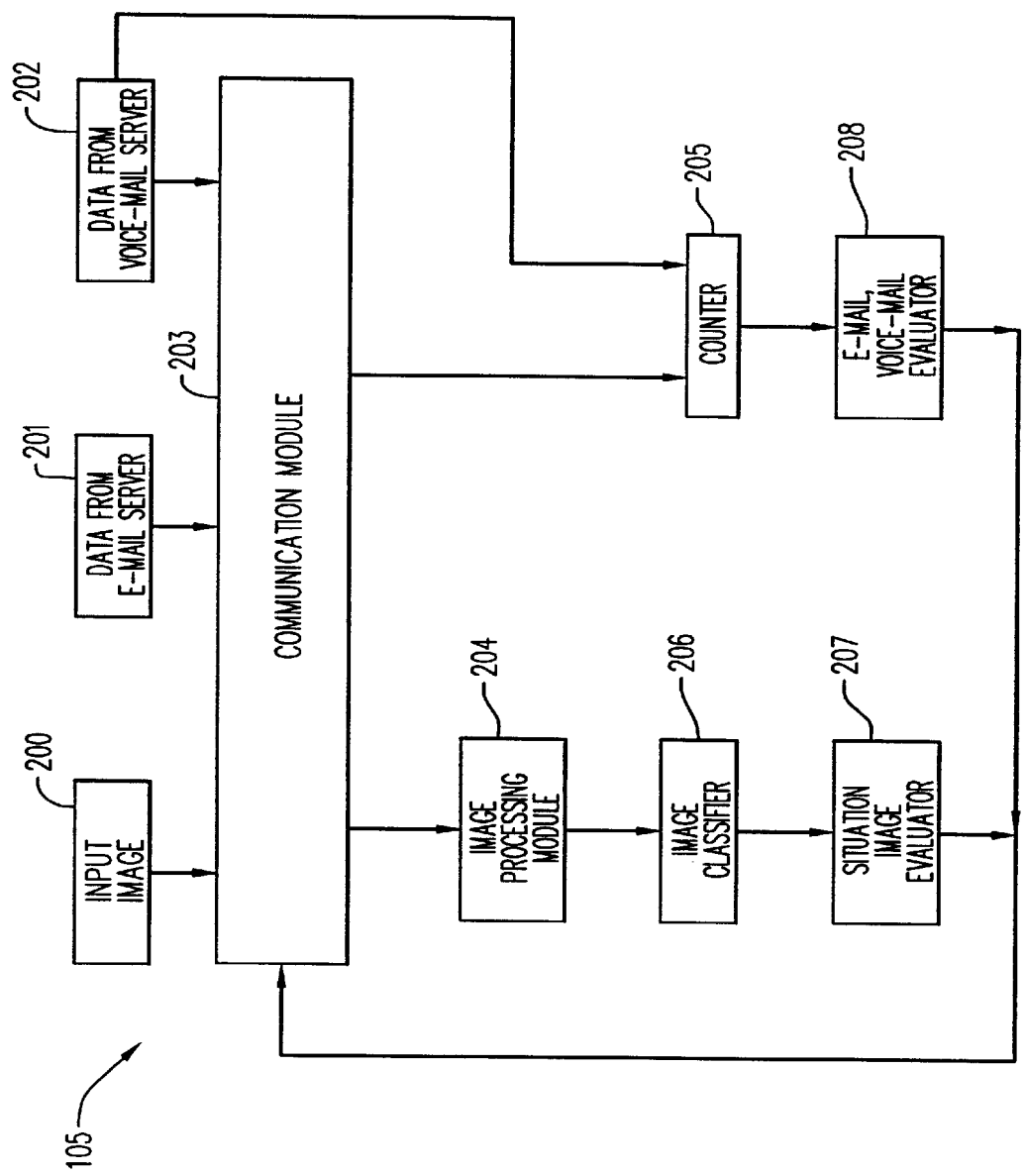
FIG. 2 is a block diagram of the situation analyzer server, depicting its constituents.

FIG. 2 depicts the constituents of the situation analyzer server 105. 203 is a communication module which allows for the receipt of information over a network. Block 200 represents the input, an image, that enters into the communication module 203. Information from an e-mail server, mainly how many messages are in a server from a certain name, enter the communication module and are represented by block 201. Similarly, data from the phone mail server 202 enters the communication module 203 noting how many phone messages are unheard, and from whom they are sent. Module 204 is the image processing module that processes images so that they can be classified by the image classifier 206. The image classifier will be described in detail in another figure. Reference "Apparatus and Method for User Recognition Employing Behavioral Passwords", was filed on May 15, 1998 as patent application Ser. No. 09/079,754, shows how images may be processed by the image processing module 204. The situation image evaluation is represented by module 207 and is also depicted in another figure. The situation image evaluator functions to evaluate situations and identify whether a person is busy or not. This evaluator 207 may also have the ability to gauge how busy a person may be, or predict the chances that a person is not busy. Module 205 is a counter that helps to gauge how busy a person is by counting the amount of unread e-mail messages and unheard voice-mail messages. This module 205 also notes the speed with which these messages are read so as to better predict a time frame for when a user can expect a message to be read/heard. Module 208 is the e-mail and voice-mail evaluator that receives data from the counter and predicts the time frame and possibility that a message will be read-heard. This data is sent to the communication module and displayed on a user's computer.

Figure 3:
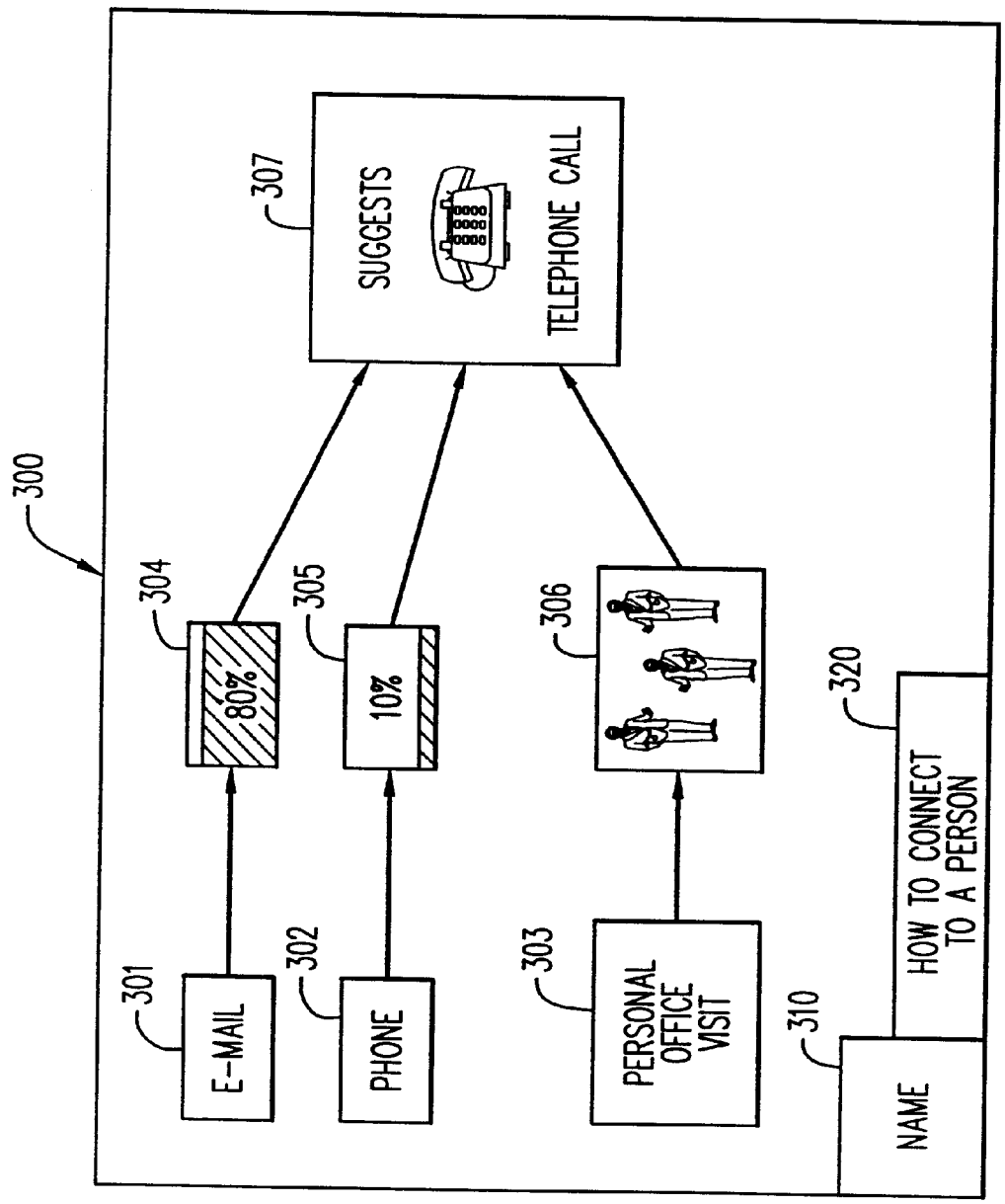
FIG. 3 depicts an example of what may be on a user's display when the user is deciding in which way they should contact a specific person.

FIG. 3 gives an example of what may be on a user's display 300 when the user is deciding in which way they should contact a specific person. The user chooses a person's name in module 310. After the name is chosen, either the person's address, e-mail or phone number is displayed in the next image. The user asks the computer how to connect to a person 320? After this question, several options are shown on the display of the computer e-mail 301, phone 302, or a personal office visit 303. These options may also be represented graphically by the situation module. For instance, a drawer 304 may be 80% full symbolizing that person has 80% of their e-mail messages unread. Another image 305 may indicate that the person has 10% of their phone voice-mail unchecked, while yet another 306 may show an office with several people in it (symbolically represented by stick figures). Following this graphic is displayed 307 recommending the user to telephone the person they are trying to reach seeing this provides the best chance for earliest communication.

Figure 4:
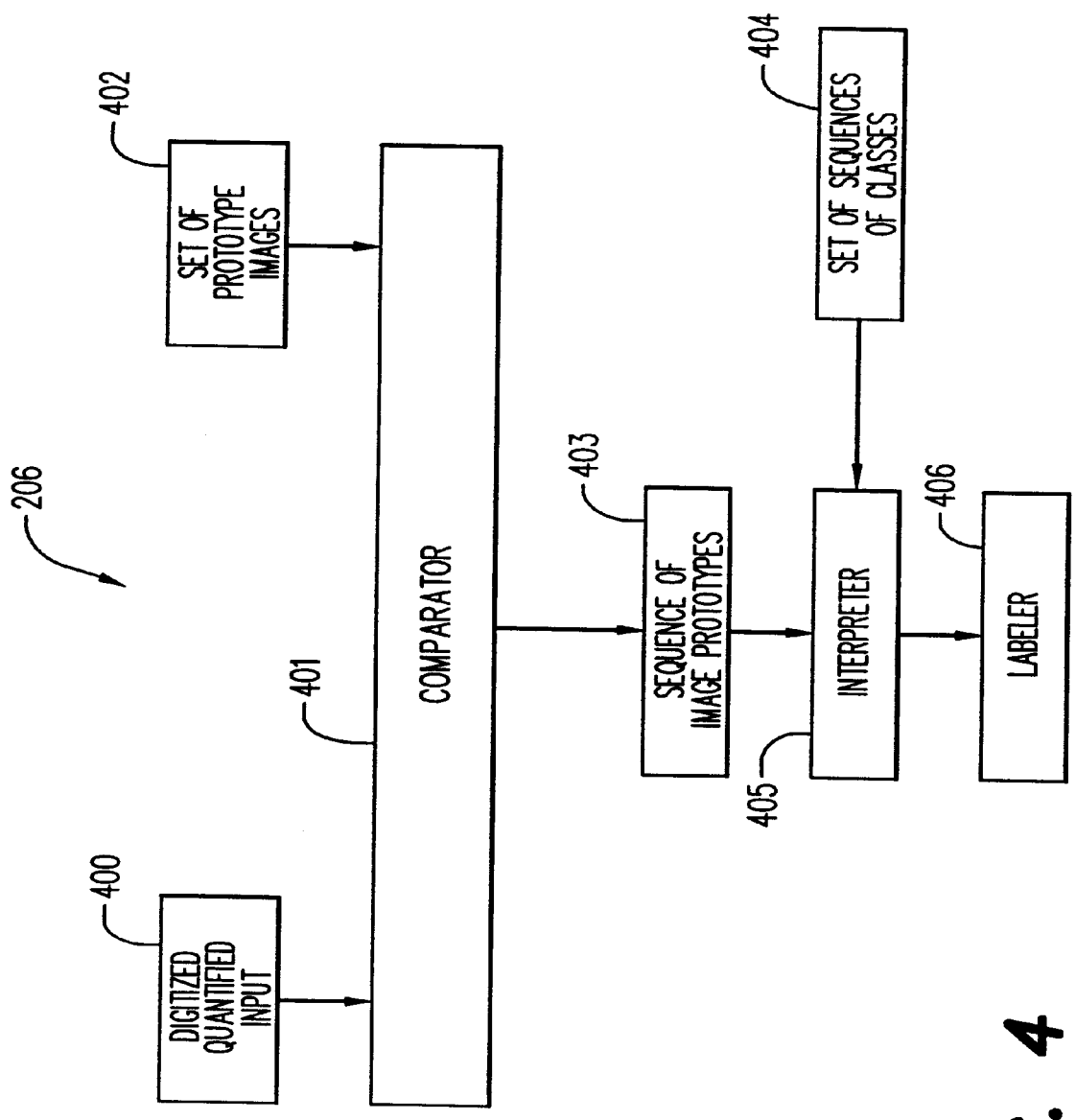
FIG. 4 is a block diagram of the image classificator, which depicts its constituents.

FIG. 4 depicts module 206, the image classifier. Module 400 digitizes and quantifies the input. Digitization means that the uninterrupted analog signal is split into frames according to certain time intervals. After every given amount of time an image is taken. The quantification of the input impels that the input is made rougher and cannot vary between different meanings for numbers. The meanings of the numbers which characterize the amplitude of the signal can take on only certain meaning. The digitized and quantified input from module 400 enters the comparator 401 which compares the images entering from module 400 with the set of prototype images in module 402. For example, module 402 can contain prototype images of somebody looking at a computer screen, somebody getting up from a chair, or somebody talking on the telephone. The result of the comparison by the comparator 401 and the set of prototype images 402 goes into module 403, the sequence of image prototypes. The sequence of image prototypes contains examples of how somebody may be having a conversation with somebody in another office, how somebody is holding the receiver for a telephone and is having a telephone conversation, or how somebody gets up from a chair and walks out of their own office. Module 405 interprets the orders of the sequences of image prototypes. This interpretation uses a set of sequences of classes 404. The sequences of classes allow for a more general characterization of the sequences of image prototypes. For example, a person is working on the computer, a person is napping, a person is talking on the telephone, or a person is having a conversation. Module 406 is a labeler of what was interpreted in 405. An example of a label may be—person is busy on the telephone, person is busy conversing with another person(s), person is busy on the computer, or on the other hand, person is free because they are not doing anything, or the person's telephone is free. In short, all of the elements used in FIG. 4 are examples of the more general outline of digitization, quantification interpretation which were described in the patent application entitled "Apparatus and Method for User Recognition Employing Behavioral Passwords", filed on May 15, 1998 as patent application Ser. No. 09/079,754.

Figure 5:
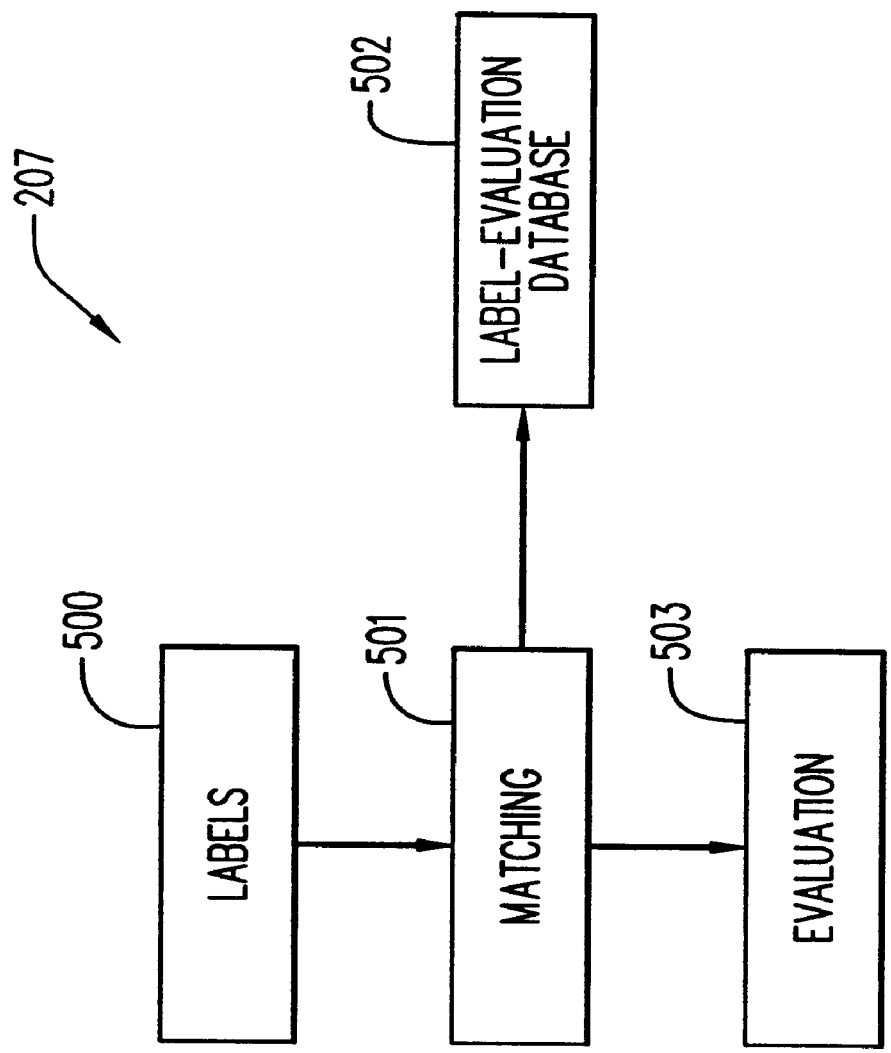
FIG. 5 is a block diagram of the situation image evaluator as well as the labeler.

FIG. 5 depicts module 207, the situation image evaluator, as well as the labeler 406 which also exists in module 207. Module 500 consists of the labels being inputted from module 206 (depicted in FIG. 4). Matching of the labels occurs in module 501 with the label-evaluation database 502. The label-evaluation database assigns a level to a person's business or freedom. This matching is done on the basis of different exemplary assignments of business or of freedom that are kept within the database. If there is a close match, a signal is sent to the evaluator 503 which then notifies the user if the person is busy, free, or not in the office.

Figure 6:
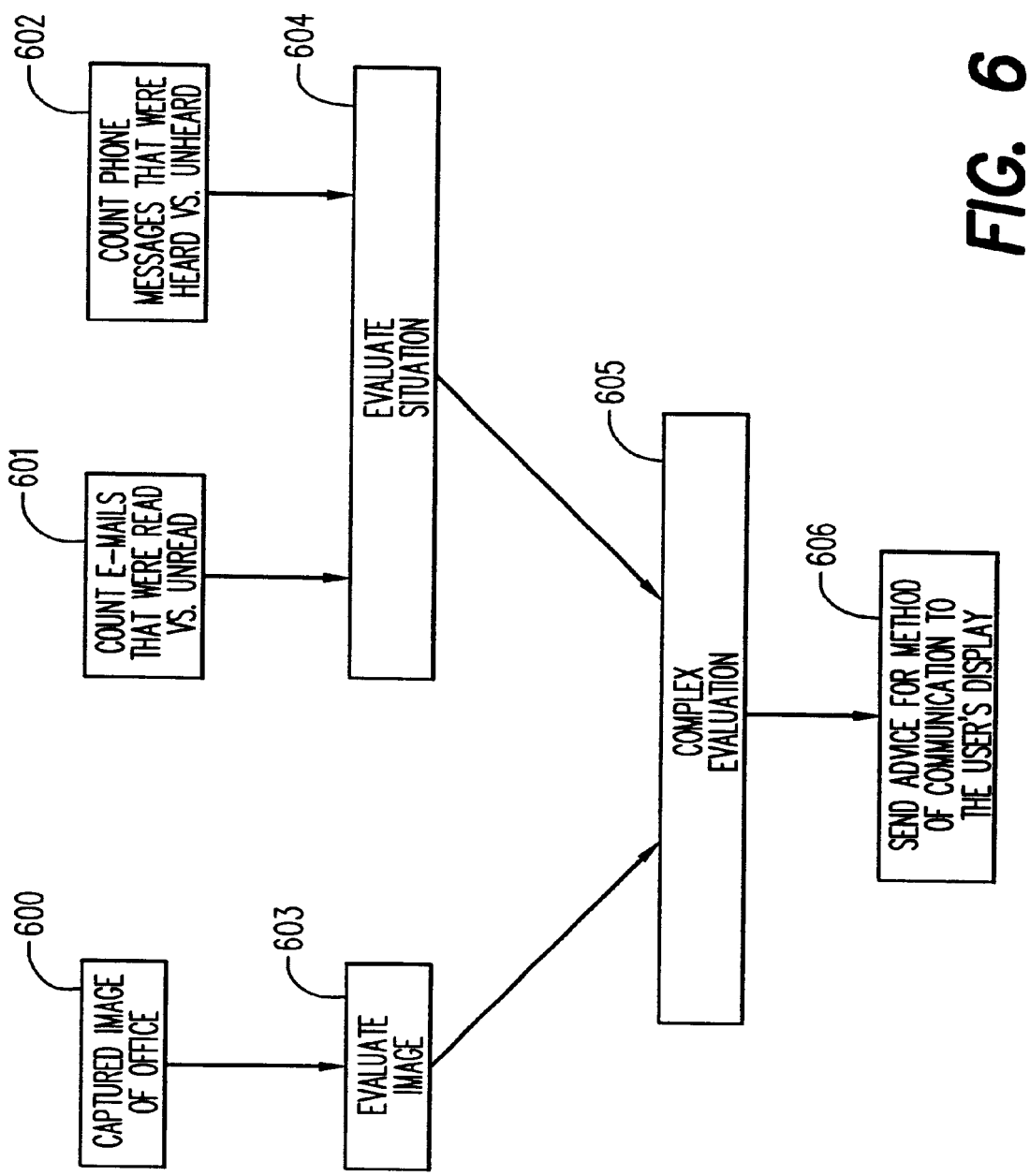
FIG. 6 is a general flowchart of the software part of the invention.

FIG. 6 is a general flowchart of the software portion of the invention involving the steps of the process carried out by the instruction of the CPU program. Such program is stored conventionally in a standard disk. 600 represents the capture of images of an office. Block 603 represents the operation of evaluating the image. Block 601 counts the e-mails that were read versus unread e-mail. Module 602 counts the phone messages that were listened to versus the phone messages not listened to. Module 604 evaluates the situation. The complex evaluation in module 605 consists of the situation evaluation 604 and the image evaluation 603. Module 606 sends advice for method of communication to the user's display. In other words, telling the user to place a call, send an e-mail, or visit the office of the person they are trying to reach.

The foregoing and still further objects and advantages of the present invention will be more apparent from the following detailed explanation of the preferred embodiments of the invention in connection with the accompanying drawings.

What is claimed is:

1. A computer system including a network for obtaining complete information as to the best mode for a first person to communicate with a second person, comprising:

means for sensing the presence of the second person in a given area and the activity in which he is engaged;

means for connecting the means for sensing to the network; and means connected to the network for enabling the first person to determine the presence and status of messages in the form of e-mail or voice mail directed to the second person, wherein the means for enabling includes an e-mail server and a voice mail server, both connected to the network;

further including a situation analyzer means connected through the network to the e-mail server and to the voice mail server for analyzing the situation in a given area, wherein the situation analyzer means recognizes the situation with respect to stacked up e-mail and voice mail directed to the second person;

means for displaying the recommended best mode for communication from the first person to the second person.

2. A computer system as defined in claim 1, wherein the first and second persons are located in respective offices, and means are present in the office for sensing the presence of at least two persons in the office.

3. A computer system as defined in claim 2, in which the means for sensing is a camera.

4. A computer system as defined in claim 1, in which the situation analyzer means includes means for evaluating the situation image, as well as means for evaluating the e-mail and voice mail situation.

5. A computer system as defined in claim 4, further including means for displaying the recommended best mode for communication from the first person to the second person.

6. A process for obtaining complete information as to the best mode for a first person to communicate with a second person comprising the steps of:

sensing the presence of the second person in a given area and the activity in which he is engaged;

keeping track of messages in the form of e-mail and voice mail directed to the second person;

evaluating the situation based on the image obtained from the given area;

evaluating the situation based on the e-mail and voice mail that has not been seen or heard; and displaying the recommended mode of communication from the evaluations obtained.

* * * * *